United States Patent
Ancona et al.

(10) Patent No.: US 6,523,457 B1
(45) Date of Patent: Feb. 25, 2003

(54) PASTA MACHINE

(75) Inventors: Bruce Ancona, New York, NY (US); Robert A. Varakian, Edgewater, NJ (US); Louis F. Henry, New York, NY (US); Sofia E. Dumery, Brooklyn, NY (US); Lyndon Treacy, Brooklyn, NY (US)

(73) Assignee: Lectrix, LLC., Edgewater, NJ (US)

( * ) Notice: Subject to any disclaimer, the term of this patent is extended or adjusted under 35 U.S.C. 154(b) by 0 days.

(21) Appl. No.: 09/994,295

(22) Filed: Nov. 26, 2001

Related U.S. Application Data
(60) Provisional application No. 60/314,685, filed on Aug. 24, 2001.

(51) Int. Cl.[7] .............................. A23L 1/00; A23C 3/00; A47J 37/12
(52) U.S. Cl. ............................ 99/330; 99/334; 99/407; 99/409
(58) Field of Search ......................... 99/330, 331–333, 99/341, 334, 342, 352–355, 403–410, 416, 417, 426, 427, 483, 411–415, 444–450, 323.5; 366/234; 426/523, 438

(56) References Cited

U.S. PATENT DOCUMENTS

| | | | |
|---|---|---|---|
| 134,143 A | * 12/1872 | Jacobus ................... 99/403 X |
| 1,162,859 A | * 12/1915 | Guillot ........................ 99/330 |
| 1,204,357 A | * 11/1916 | Jefferson ................. 366/234 X |
| 1,489,758 A | * 4/1924 | Hanson .................. 366/234 X |
| 2,027,146 A | * 1/1936 | Bly et al. ............... 99/323.5 X |
| 2,741,463 A | * 4/1956 | Colclesser .............. 366/234 X |
| 2,835,123 A | * 5/1958 | Galinski ................ 366/234 X |
| 4,203,358 A | * 5/1980 | Vogt ............................ 99/352 |
| 5,134,927 A | * 8/1992 | McCarthy, III et al. ....... 99/427 |
| 5,543,166 A | * 8/1996 | Masel et al. ................. 426/523 |
| 5,586,487 A | * 12/1996 | Marino ........................ 99/330 |
| 5,993,872 A | * 11/1999 | Rolle et al. ............... 99/409 X |
| 6,077,555 A | * 6/2000 | Dotan ..................... 99/330 X |

* cited by examiner

*Primary Examiner*—Timothy F. Simone
(74) *Attorney, Agent, or Firm*—Jean C. Edwards; Sonnenschein Nath & Rosenthal (57) ABSTRACT

A pasta machine includes a housing with a removable container for holding a liquid such as water, and the housing includes a heater for heating the liquid to a boiling state. An enclosed colander having a cover and holding a food product such as pasta is disposed on the container and includes arms to allow it to rotate through the boiling water. The housing of the pasta machine includes a suitable control mechanism that controls rotation of the colander through the boiling water to cook the food product within the colander. The number of rotations and intervals between rotation are a function of the type and amount of pasta within the colander.

19 Claims, 7 Drawing Sheets

PASTA MACHINE

RELATED APPLICATION

This application claims the benefit of U.S. Provisional Application Serial No. 60/314,685, filed Aug. 24, 2001. The disclosure of U.S. Provisional Application Serial No. 60/314,685 is incorporated herein by reference.

FIELD OF THE INVENTION

The present invention relates generally to kitchen appliances and, more particularly, to an easy to use, quick and efficient pasta machine. The present invention relates also to such a machine for use as a deep fryer, steamer or crock-pot.

BACKGROUND OF THE INVENTION

Traditionally, cooking pasta involves boiling of water in a large pot, adding the pasta to the boiling water, and then removing the pasta once cooked. Once removed from the boiling water, the now-cooked pasta quickly becomes cold. Various ways of keeping the pasta hot includes keeping the pasta in the hot water until served or placing the hot pasta in a sealed dish or container.

Although cooking pasta in the aforementioned manner, as well as the results thereof, is acceptable to many individuals, both the process of cooking pasta and the manner of keeping cooked pasta hot are ripe for improvement.

OBJECTS OF THE INVENTION

It is therefore an object of the present invention to provide a pasta machine that cooks pasta in a convenient and easy manner.

It is another object of the present invention to provide a pasta machine that keeps cooked pasta hot also in a convenient and easy manner.

It is a further object of the present invention to provide a machine that cooks and keeps hot other types of food.

Various other objects, advantages and features of the present invention will become readily apparent to those of ordinary skill in the art, and the novel features will be particularly pointed out in the appended claims.

SUMMARY OF THE INVENTION

In accordance with the present invention, a pasta machine is provided with a housing having a container for holding a liquid such as water, and the housing includes a heater for heating the liquid preferably to a boiling state. The pasta machine includes an enclosed colander for holding a food product such as pasta, and the colander includes a cover to allow placement of the food product within it. The colander is disposed on the container and is able to rotate through the boiling liquid. The housing of the pasta machine includes a suitable control mechanism that controls rotation of the colander through the boiling liquid to cook the food product within the colander.

As an aspect of the present invention, the pasta machine includes a lid that can be placed on top of the housing to fully contain the colander, and the lid includes an opening to allow steam to escape.

As another aspect of the present invention, the colander includes a flat bottom surface, two side surfaces and a curved top surface, and the curved top surface has a plurality of apertures to allow the water to drain. The colander also has two arms that extend from its side surfaces at the center of the flat bottom surface along a single axis, so that the colander is able rotate about that axis. Thus, the colander is nearly fully submerged within the water during part of its rotation.

As a further aspect of the present invention, the container within the housing is removable.

As an additional aspect of the present invention, the control device within the housing controls rotation of the colander in accordance with the type of food product within the colander.

As a feature of this aspect, a user identifies to the pasta machine the type and amount of food product within the colander, and the pasta machine controls rotation of the colander in accordance with the provided information.

As another feature of the present invention, the colander is moved back to its initial, raised position after the food product is cooked.

As yet another aspect of the present invention, the colander is rotated through the water by rotating first in one direction, and then in the opposite direction, where the colander essentially is rocked back and forth.

As yet a further aspect of the present invention, the pasta machine re-heats the food product within the colander if the food product is not removed from the colander within a predetermined amount of time after the food product is cooked.

As a feature of this aspect, the food product is re-heated by rotating the colander to submerge the food product in heated water once every pre-set number of minutes.

As another feature, the pre-set number of minutes is a function of the type and quantity of the food product in the colander.

In accordance with a method of cooking a food product of the present invention, an enclosed colander is filled with a predetermined amount of food product, the colander is placed on a container holding a liquid, the liquid is heated to a boiling state, and the colander is rotated a predetermined number of times through the boiling liquid until the food product within the colander is cooked.

Various features and aspects of this method correspond to features and aspects of the pasta machine summarized above.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE INVENTION

The pasta machine of the present invention cooks pasta quickly, efficiently, safely and with little human assistance. In general, the pasta machine simply requires the user to place pasta within the machine, to turn the machine on, and then return back to the machine some period of time later (e.g., 20 minutes) to produce perfectly cooked pasta. In one embodiment, as herein described, the machine is designed specifically for cooking pasta, but it is possible for such a device to be used as a deep fryer, steamer or crock-pot. Moreover, while the first embodiment described below is concerned with cooking pasta, other types of foods can be cooked by the machine of the present invention, including potatoes, vegetables, beans, crab fish, etc.

Figure 1:
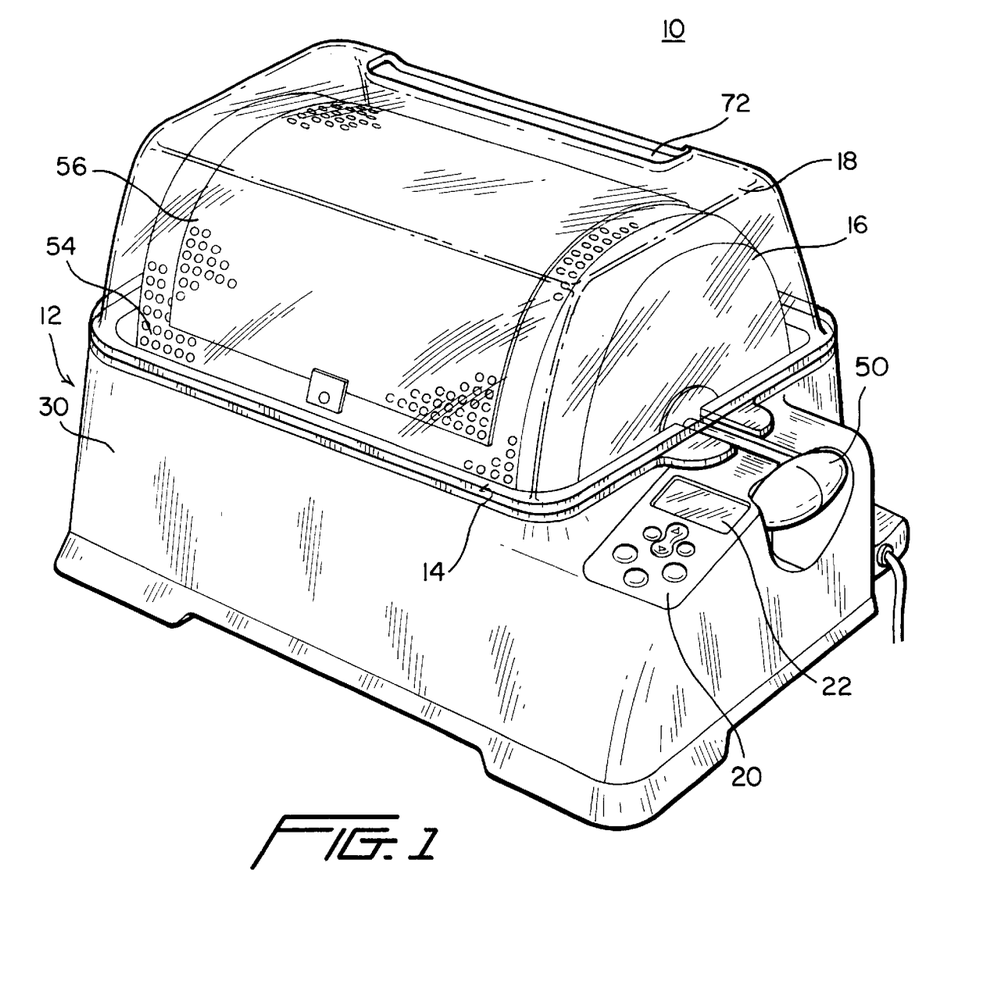
FIG. 1 is a schematic illustration of the pasta machine of the present invention.
Figure 2:
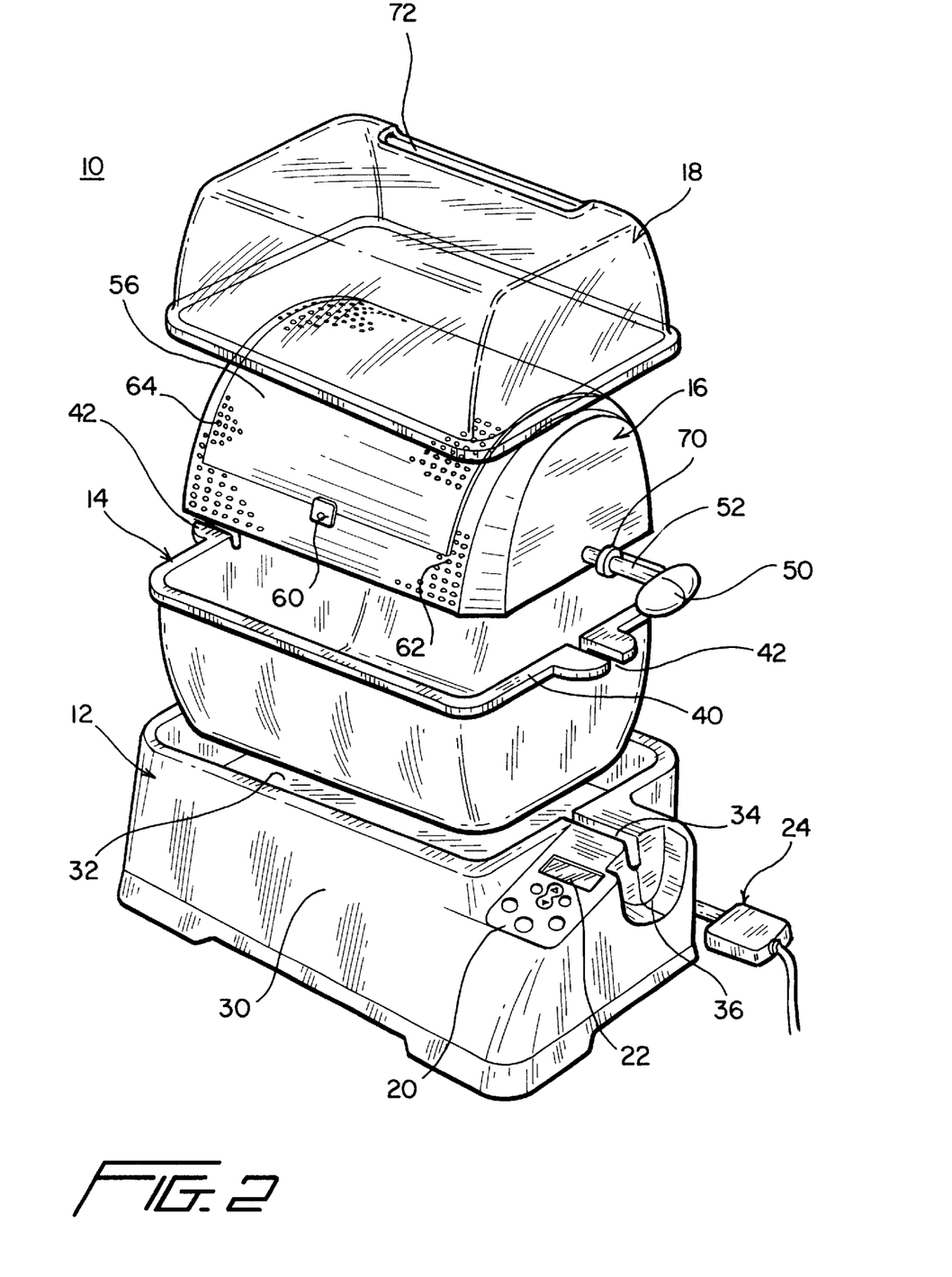
FIG. 2 is an exploded view of the pasta machine shown in FIG. 1.

Referring now to the drawings, FIG. 1 is a schematic illustration of the pasta machine 10 of the present invention, and FIG. 2 is an exploded view thereof. As shown in FIGS. 1 and 2, pasta machine 10 (also called pasta cooker) includes a housing 12, a water container 14, a colander 16, and a clear lid 18. Housing 12 includes a control panel 20, an LCD screen 22, and an electrical plug 24. Plug 24 provides electrical power to the pasta machine when plugged into an appropriate electrical receptacle. The operation of control panel 20 and LCD screen 22 is discussed further below.

Housing 12 further includes a body 30 in which various electrical and heating elements (not shown) are disposed. These electrical and heating components carry out the below-described heating of the present invention. The pasta machine's body 30 is shaped to provide a well 32 into which water container 14 is placed during operation. The body 30 of the pasta machine's housing includes an arm recess 34 and a handle recess 36 disposed at one end, as shown, and also includes a second arm recess and a second handle recess disposed at the other end of body 30 (not shown in FIGS. 1 and 2). Each set of arm and handle recesses 34, 36 are shaped to accommodate respective handles 50 that extend from the sides of colander 16.

Water container 14 is used to hold a preset amount (e.g., 5 quarts) of water and is shaped to fit into well 32 of housing 12, as mentioned above, and includes an edge 40 which supports water container 14 when placed into well 32. Water container 14 further includes a pair of openings 42, one on each end, to accommodate the arm portions 52 of each handle 50 extending from the ends of colander 16.

Figure 8:
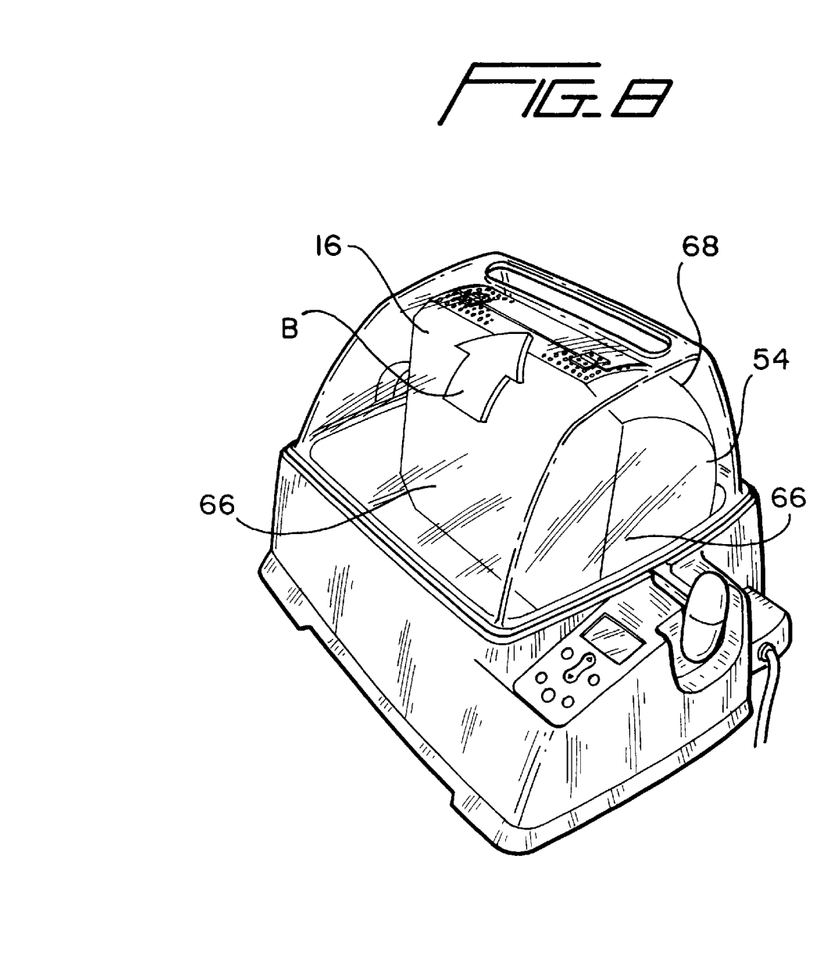
Figure 11:
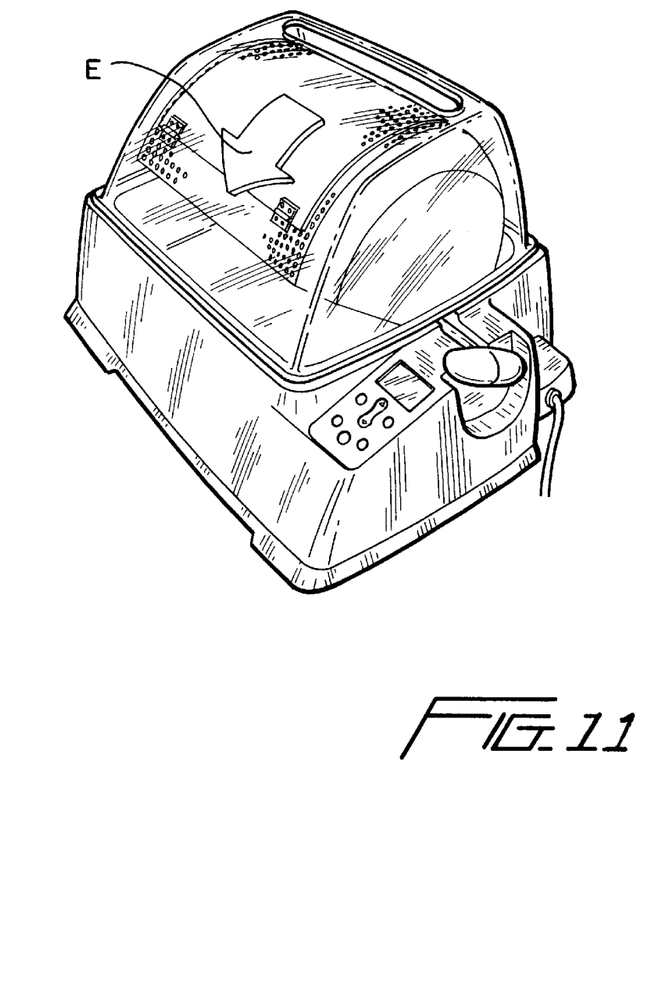

Colander 16 includes a container portion 54 and, as described below, is used to hold the pasta during cooking. Colander 16 also includes a cover 56 hinged to container portion 54 (or simply, container 54) via a set of hinges 58 (shown in FIG. 3), and a latch 60 designed to keep cover 56 in the closed position during operation (discussed below). Latch 60 is any appropriate device that may be manually unlocked to allow colander 16 to be opened. Like a typical colander, the colander's container portion 54 includes many apertures (i.e., holes) 62 to allow water to enter into and exit from the inner enclosure of colander 16. Similarly, the colander's cover 56 includes many apertures 64 to also allow water to enter into and exit from the colander's enclosure. As illustrated in FIG. 8, the container portion 54 of colander 16 includes a flat bottom surface 66 and, in the preferred embodiment, surface 66 does not include any apertures. Rather, colander 16 includes holes along its entire curved top surface 68, encompassing the entire cover 56 and the curved portions of the top surface of the colander's container portion 54, as best shown in FIGS. 4, 5, 7 and 8. As will be discussed, apertures 62 and 64 on colander 16 allow the boiling water to cook the pasta contained within the closed colander.

During operation, colander 16 is disposed above water container 14 and is supported on the two arm recesses 34 of housing 12. One of the handle arm portions 52 of colander 16 includes a fixed gear wheel 70 that comes into contact with an opposing drive wheel (not shown) disposed within arm recess 34 of housing 12. During operation, the drive wheel disposed within housing 12 is controlled to rotate gear wheel 70 thus rotating colander 16 about an axis extending through the colander's two arm portions 52.

Pasta machine 10 finally includes a clear lid 18 shaped to fully encompass colander 16 when resting on top of edge 40 of water container 14, and serves to prevent splashing of water during operation of the pasta machine. Lid 18 includes a wide opening 72 to enable steam to escape during operation. Although not shown, lid 18 optionally may include a heat resistant handle to allow removal of the lid without any risk of touching a potentially hot surface of lid 18 during use. Moreover, handles 50 of colander 16 similarly are heat resistant to allow lifting of colander 16 from the remaining components of the pasta machine after use, as further discussed below.

The operation of the pasta machine of the present invention will now be described with reference to FIGS. 3–12 of the drawings. To utilize the pasta machine, the user first removes water container 14, colander 16 and lid 18 from the pasta machine housing 12. Water container 14 is filled with a predetermined amount of water (e.g., 5 quarts) and, in the preferred embodiment, the top water level is identified within the water container to assist the user. Water container 14, now filled with water, is placed within well 32 of the pasta machine housing 12. Alternatively, water container 14 can be filled with water while disposed within housing 12. One (1) tablespoon of water preferably is added to the water.

Figures 3, 9, 10:
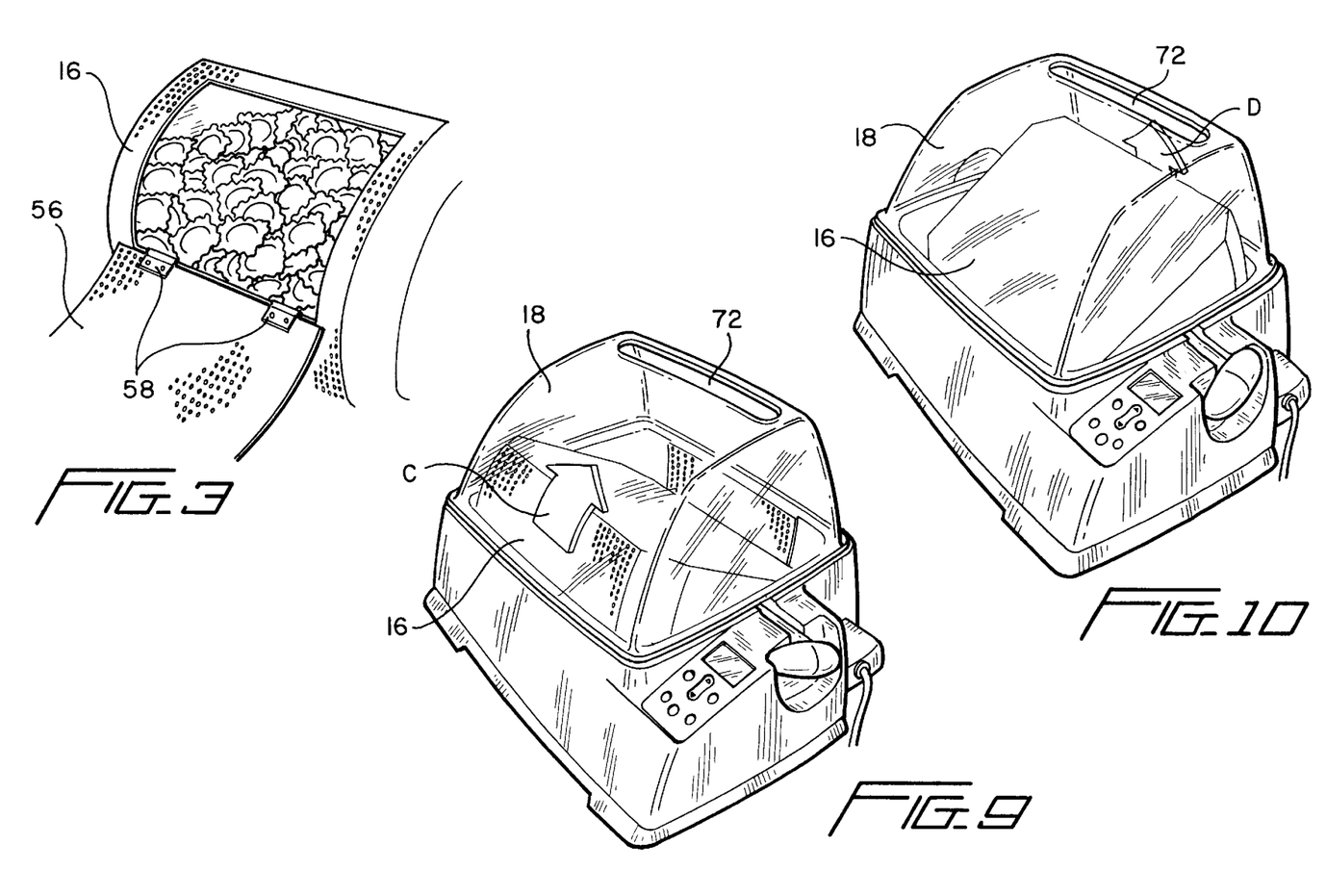
FIG. 3 is a view of an open colander containing pasta.
FIGS. 7–11 illustrate the operation of the pasta machine of the present invention.
Figures 4, 5, 6:
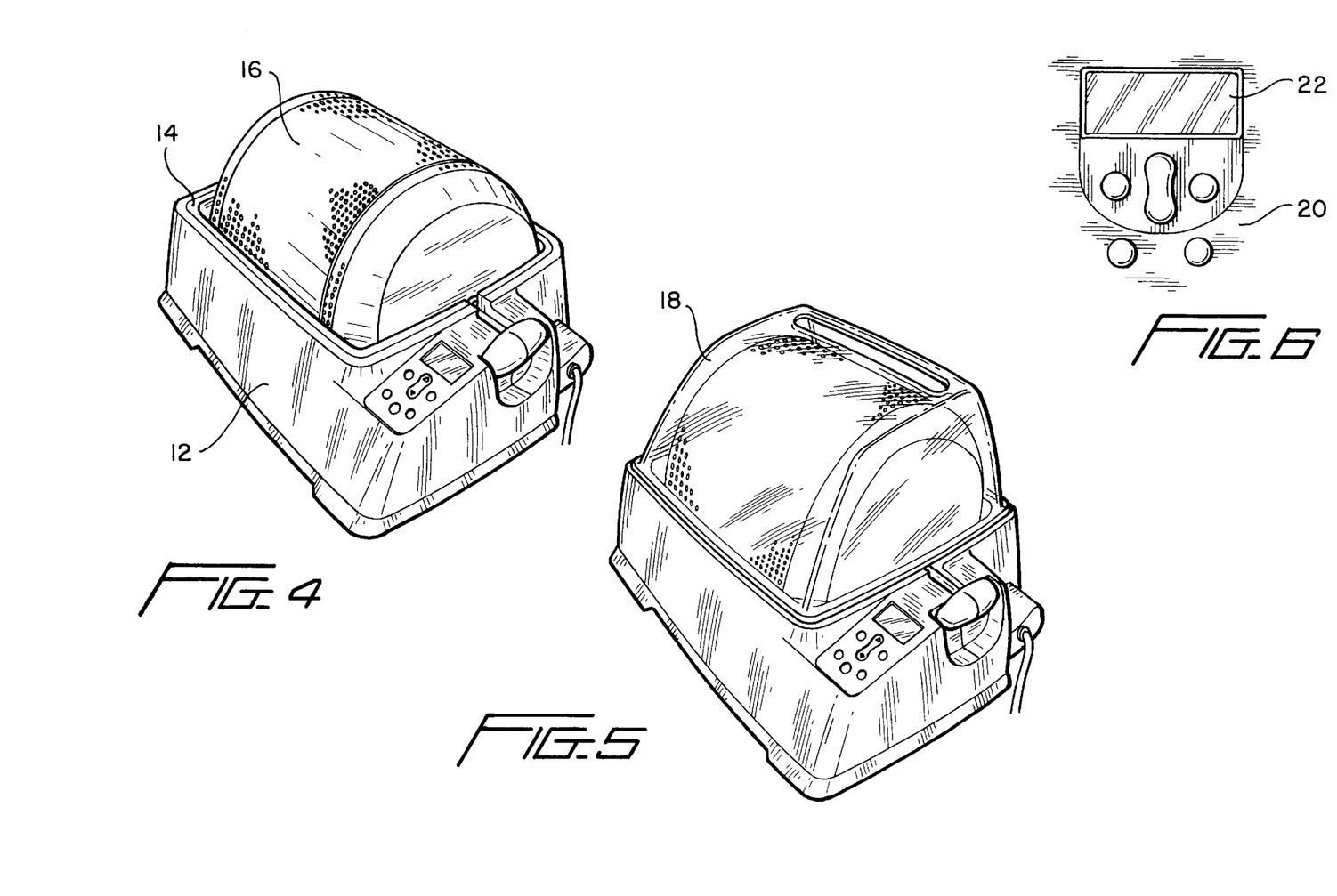
FIG. 4 schematically illustrates placement on the colander within the pasta machine's water container.
FIG. 5 illustrates placement of the cover on the pasta machine.
FIG. 6 illustrates the pasta machine's LDC panel and display.
Figure 7:
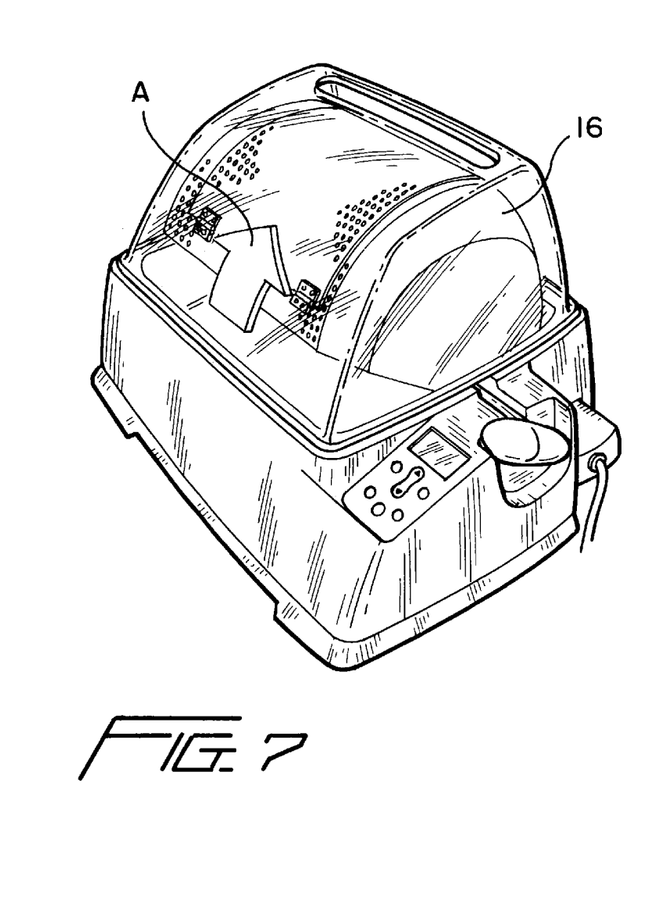

As shown in FIG. 3, cover 56 of colander 16 is opened and a predetermined amount of pasta (e.g., 1 pound) is placed within colander 16. Cover 56 is closed and colander 16 is placed in the upright position within water container 14 (which is filled with water and disposed within housing 12), as shown in FIG. 4. As shown, in the upright position, the flat surface 66 (see FIG. 8) is disposed on the bottom immediately above the water. The user then places lid 18 on the assembled components to fully cover colander 16, as shown in FIG. 5.

Upon adding water to water container 14, filling colander 16 with pasta and assembling the components as discussed above, the pasta machine of the present invention now is ready to begin operating. Accordingly, the user turns on the pasta machine's power by depressing the power button on control panel 20, such as shown on the exemplary control panel 20 shown in FIG. 6. Next, the user selects the type of pasta (e.g., spaghetti, lasagna, linguini, etc.) using the appropriate buttons on control panel 20, and optionally may also select one of the cooking preferences available, such as regular or al dente in the case of cooking pasta. Alternatively, the user may set the time of operation of cooking. The operation of programming a cooking appliance and the associated electronics and firmware necessary to carry such operation are well known in the art and thus further description thereof is not provided except where necessary for an understanding of the present invention.

Thus, the pasta machine of the present invention may include other types of control interface, including mechanical knobs or other devices, than those shown and described herein. An exemplary operation of the cooking machine of the present invention by a user is further described below with reference to FIG. 13 of the drawings.

Upon completion of programming the pasta machine of the present invention, the amount of time remaining until the pasta is fully cooked preferably is displayed on LCD display screen 22. After programming the pasta machine, the heating elements within housing 12 begin heating the water within water container 14. A thermostat (not shown) within housing 12 determines when the water within water container 14 is boiling, at which point, a motor within housing 12 begins rotating colander 16 via gear wheel 70 attached to the colander (see FIG. 2). Colander 16 is rotated slowly about the previously mentioned axis extending along arm portions 52 in the direction A shown in FIG. 7 so that the pasta within colander 16 begins to submerge into the boiling water. Colander 16 continues to rotate, as shown in FIG. 8, in the same direction (direction "B" in FIG. 8) until colander 16 is completely upside-down, where all of the pasta within the colander is submerged in the water.

Figure 12:
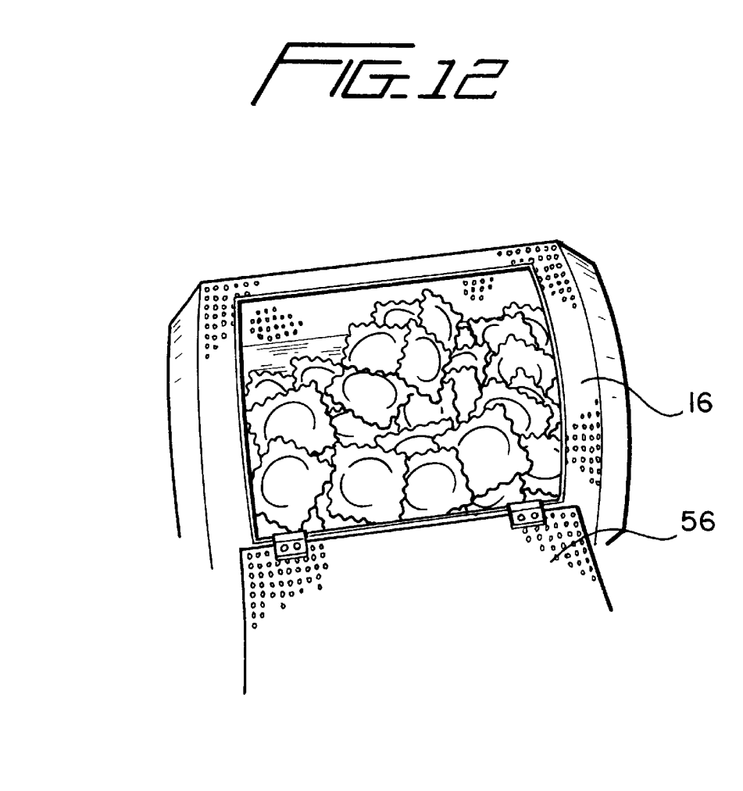
FIG. 12 illustrates pasta within the colander cooked by the pasta machine of the present invention.

Once fully submerged, the pasta machine causes colander 16 to rotate back and forth, first rotating in the same direction, "C" in FIG. 9, to the position shown in FIG. 9, then rotating in the opposite direction, "D" in FIG. 10, to the position shown in FIG. 10. This cycle then repeats itself. During this process, steam within the enclosed unit vents through opening 72 in lid 18. As shown in FIGS. 9 and 10, colander 16 "rocks" back and forth so that the pasta within the colander is rotated in and out of the water in repeated cycles until the required (predetermined) amount of cooking time has elapsed. Upon completion of cooking, colander 16 is controlled to rotate back in direction E shown in FIG. 11 back to its initial starting position, thus rotating the pasta completely out of the water, that is, the pasta is fully drained of water. At this time, LCD display screen 22 alerts the user that the pasta is fully cooked. Optionally, the pasta machine may provide an appropriate audible indication that cooking is complete. The user then removes lid 18 from the unit, lifts colander 16 via handles 50 to remove it from the pasta machine's housing and opens the colander's cover 56 to reveal fully cooked pasta, as shown in FIG. 12. Then, the now-cooked pasta is removed from colander 16 and served. The user turns off the pasta machine by depression of the power button on control panel 20.

If the user, however, does not remove colander 16 and likewise does not turn off the pasta machine, the pasta machine carries out a warming function in accordance with the present invention. Upon completion of cooking and rotating all of the pasta out of the water (see FIG. 11), as discussed above, the heating element within housing 12 is automatically set to a low setting to keep the water relatively hot. To keep the pasta within colander 16 warm, colander 16 is controlled to rotate the pasta into the water every several minutes (e.g., 5 minutes), and since the water is maintained at a relatively hot temperature, the pasta within the colander is maintained hot for an indefinite amount of time. Moreover, since the pasta is rotated through the hot water only one time every several minutes, the pasta does not cook further during this time. Moreover, based on user programming, and particularly identifying the type of pasta to be cooked, the warming process of the present invention optionally may be further enhanced by pre-setting (not by the user, but during design and construction of the pasta machine) how often the pasta is rotated through the water, and, if necessary, the amount of time the pasta is fully contained within the hot water, depending on the type of pasta. For example, due to characteristics of certain types of pasta, such pasta may be cycled through the hot water every 2 minutes, whereas other types of pasta may be cycled through the hot water only every 7 minutes, and so on.

Upon completion of cooking and removal of the cooked pasta, the pasta machine should be unplugged and the water within container 14 should be removed.

Figure 13:
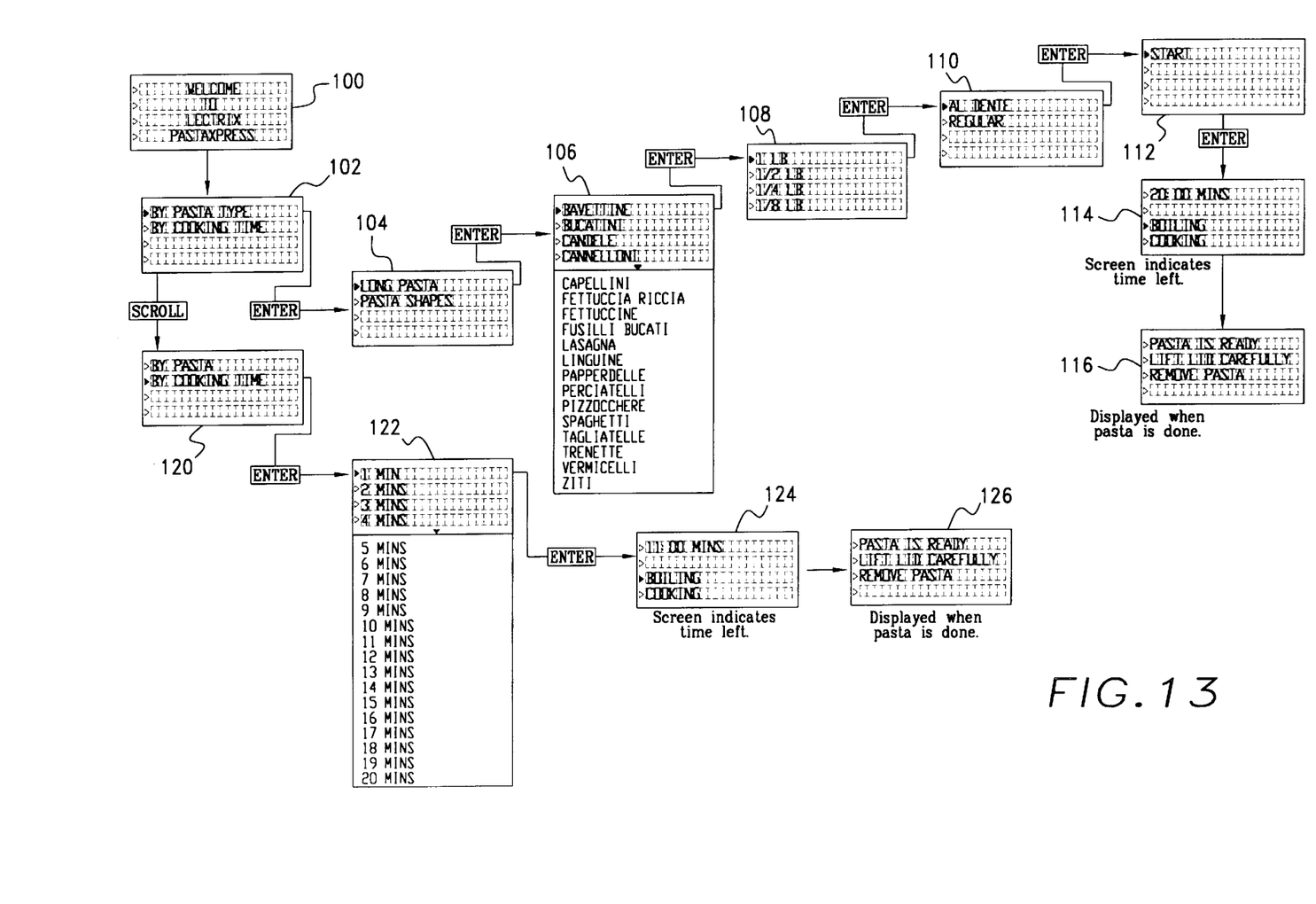
FIG. 13 is a flowchart of the display of the LCD display during the various operations of the pasta machine of the present invention.

FIG. 13 shows an exemplary flow chart of programming and operation of the pasta machine of the present invention. Upon supplying power to the pasta machine, display 22 provides a suitable greeting in block 100, and then, in block 102, requests the user to indicate whether he/she want to program the pasta machine by identifying the type of pasta to be cooked, or to simply indicate the amount of cooking time. If the user indicates by pasta type, then the pasta machine requests the user to identify whether the pasta is long pasta or pasta shapes in block 104. In block 106, the particular type of pasta is selected by the user, in block the user identifies the amount of pasta to be cooked, and in block 110 the user identifies whether the pasta is to be cooked al dente or regular. Thereafter, operation of the pasta machine begins in block 112 and in block 114 the pasta machine identifies the amount of time remaining until the pasta is complete, and the current, particular cycle of operation such as whether the water is being boiled or whether the pasta is being cooked (which, as previously discussed, occurs after the water has boiled). Upon completion of cooking, the pasta machine informs the user that the pasta is ready in block 116.

Returning to block 102, if the user desires to simply enter the amount of cooking time—in block 120—then the user enters that amount in block 122. Block 124 is the same as block 114, whereby the remaining amount of time is displayed along with the current cycle of operation of the pasta machine. The user is informed of completion of cooking in block 126.

In the above-described embodiments, the present invention has been described as a pasta machine for cooking pasta. Of course, the design may be modified if necessary to cook other types of foods. For example, the machine can be designed to be a deep fryer, a steamer or crock-pot and used to cook different types of foods including potatoes, vegetables, beans, crab fish, and so on. Accordingly, container 14 as described above is a water container. But, in various alternative embodiments of the present invention, the container may be used to contain other liquids such as oil in various different applications of the present invention. For example, as a deep fryer, the container is filled with oil which is heated by the heating element(s) within housing 12. Accordingly, the amounts of time particular foods within colander 16 are submerged within the heated oil may be pre-programmed, as well as amounts of time and time(s) between cycles of the warming process, all dependent upon the type of food being cooked/warmed.

Still further, the pasta machine of the present invention may be modified to be a steamer, where various dimensions of the components of the present invention are established so that food within the colander does not submerge within the boiling water, but is instead disposed immediately above the boiling water.

In another embodiment of the present invention, the colander is comprised of two or more compartments disposed side-by-side, where each compartment is separately controlled to rotate through the hot water. In such embodiment, different types of food/pasta may be cooked simultaneously by appropriately programming the pasta machine (i.e., identifying the respective types and amounts of pasta within the different compartments of the colander). In one example, the colander is divided into a left compartment and a right compartment, where two different types of pasta may be cooked within the different compartments. Of course, the two compartments of the colander may operate as a single compartment if the same type of pasta is being cooked in both compartments. In such case, both compartments are controlled to cycle through the hot water at the same time. If, however, different types of pasta are provided in the two compartments, then each compartment is separately controlled to cycle through the water. Also, warming is separately controlled for compartments containing different types of pasta.

In a further embodiment, both the colander and the container (e.g., water container 14) may each comprise multiple compartments, where different types of liquids may be provided in the different compartments of the container. For example, a left container compartment is filled with water, and a right container compartment is filled with oil, and thus the food within the left compartment of the colander is cooked in the boiling water and the food within the right compartment of the colander is deep fried. Of course, more than two compartments may be provided, and different types of cooking may be accommodated by a single device.

While the present invention has been particularly shown and described in conjunction with various embodiments thereof, it will be readily appreciated by those of ordinary skill in the art that various changes may be made without departing from the spirit and scope of the invention. For example, the specific shapes of the various elements may be modified to be different than that shown in the drawings. While preferred, the colander may include a non-curved top surface and/or a curved bottom surface, the water container may be rounded, and so on.

Therefore, it is intended that the appended claims be interpreted as including the embodiments described herein, the alternatives mentioned above, and all equivalents thereto.

What is claimed is:

1. A cooking machine, comprising:
    a housing having a container for holding a liquid; said housing including a heater for heating the liquid within the container to a boil;
    an enclosed colander adapted to hold a food product and having a cover to allow placement of the food product within the colander; the colander being disposed on the container and rotatable through the liquid within the container; and
    a lid disposed on top of the housing to fully contain the colander, the lid including an opening to allow steam produced by boiling liquid to escape;
    the housing including a mechanism for controlling the rotation of the colander through the liquid when heated by the heater so as to cook the food product within the colander.

2. The cooking machine of claim 1, wherein the container is removable from the housing; and the housing includes a well adapted to receive the container.

3. The cooking machine of claim 1, wherein the housing includes a control device for controlling the rotation of the colander through the liquid when heated in accordance with a type of food product disposed within the colander.

4. The cooking machine of claim 1, wherein the housing is adapted to control the heater to heat the liquid in the container, to control the rotation of the colander to cause the colander to be at least substantially submerged in the liquid a predetermined number of times, and then to rotate the colander back to an initial position.

5. A cooking machine, comprising:
    a housing having a container for holding a liquid; said housing including a heater for heating the liquid within the container; and
    an enclosed colander adapted to hold a food product and having a cover to allow placement of the food product within the colander; the colander being disposed on the container and rotatable through the liquid within the container;
    the housing including a mechanism for controlling the rotation of the colander through the liquid when heated by the heater so as to cook the food product within the colander;
    the colander including a flat bottom surface, two side surfaces and a curved top surface, the curved top surface having a plurality of apertures; the colander further including two arms extending from the respective side surfaces near a center of the flat bottom surface along a single axis; and the colander being adapted to rotate about the single axis so that at least a substantial portion of the colander is capable of being submerged within the liquid during use of the cooking machine.

6. A cooking machine, comprising:
    a housing having a container for holding a liquid; said housing including a heater for heating the liquid within the container; and
    an enclosed colander adapted to hold a food product and having a cover to allow placement of the food product within the colander; the colander being disposed on the container and rotatable through the liquid within the container;
    the housing including a mechanism for controlling the rotation of the colander through the liquid when heated by the heater so as to cook the food product within the colander;
    the control device being adapted to receive a user supplied identification of the food product within the colander, and the control device controlling the heater to boil the liquid within the container and controlling the rotation of the colander through the boiling liquid a predetermined number of times in accordance with the supplied identification of the food product.

7. The cooking machine of claim 6, wherein the control device further controls the rotation of the colander to stop after the predetermined number of times of rotation of the colander has occurred and to control the colander to rotate to a position where none of the food product in the colander is submerged in the liquid disposed in the container.

8. A cooking machine, comprising:
    a housing having a container for holding a liquid; said housing including a heater for heating the liquid within the container; and
    an enclosed colander adapted to hold a food product and having a cover to allow placement of the food product within the colander; the colander being disposed on the container and rotatable through the liquid within the container;
    the housing including a mechanism for controlling the rotation of the colander through the liquid when heated by the heater so as to cook the food product within the colander;
    the housing being adapted to control the heater to heat the liquid in the container, to control the rotation of the colander to cause the colander to be at least substantially submerged in the liquid a predetermined number of times, and then to rotate the colander back to an initial position, and during control of the rotation of the colander, the housing for each time of rotation is adapted to rotate the colander in a first direction to cause the food product within the colander to be at least substantially submerged in the liquid, to continue to rotate the colander in the first direction to cause at least a portion of the food product to emerge from the liquid, to rotate the colander in a second direction opposite the first direction to cause the food product to again be at least substantially submerged in the liquid, and to continue to rotate the colander in the second direction to cause at least a portion of the food product to emerge from the liquid.

9. A cooking machine, comprising:

a housing having a container for holding a liquid; said housing including a heater for heating the liquid within the container; and an enclosed colander adapted to hold a food product and having a cover to allow placement of the food product within the colander; the colander being disposed on the container and rotatable through the liquid within the container;

the housing including a mechanism for controlling the rotation of the colander through the liquid when heated by the heater so as to cook the food product within the colander;

the housing being adapted to control the heater to heat the liquid in the container, to control the rotation of the colander to cause the colander to be at least substantially submerged in the liquid a predetermined number of times, and then to rotate the colander back to an initial position;

the housing being adapted to re-heat the food product within the colander after passage of a predetermined amount of time after rotation of the colander back to the initial position and if the food product is not removed from the colander.

10. The cooking machine of claim 9, wherein the housing is adapted to re-heat the food product by rotating the colander to submerge the food product within the colander in the heated liquid once every pre-set number of minutes.

11. The cooking machine of claim 10, wherein the pre-set number of minutes is a function of the type of food product in the colander.

12. A cooking machine, comprising:

a housing having a container for holding a liquid; said container being adapted to heat the liquid within the container when a heat source is supplied to the container;

an enclosed colander adapted to hold a food product and having a cover to allow placement of the food product within the colander; the colander being disposed on the container and rotatable through the liquid within the container; and a lid disposed on top of the housing to fully contain the colander, the lid including an opening to allow steam produced by boiling liquid to escape;

the housing including a mechanism for controlling the rotation of the colander through the liquid when heated by the heat source so as to cook the food product within the colander.

13. The cooking machine of claim 12, wherein the container is removable from the housing; and the housing includes a well adapted to receive the container.

14. The cooking machine of claim 12, wherein the housing includes a control device for controlling the rotation of the colander through the liquid when heated in accordance with a type of food product disposed within the colander.

15. A cooking machine, comprising:

a housing having a container for holding a liquid; said container being adapted to heat the liquid within the container when a heat source is supplied to the container; and an enclosed colander adapted to hold a food product and having a cover to allow placement of the food product within the colander; the colander being disposed on the container and rotatable through the liquid within the container;

the housing including a mechanism for controlling the rotation of the colander through the liquid when heated by the heat source so as to cook the food product within the colander;

the colander including a flat bottom surface, two side surfaces and a curved top surface, the curved top surface having a plurality of apertures; the colander further including two arms extending from the respective side surfaces near a center of the flat bottom surface along a single axis; and the colander being adapted to rotate about the single axis so that at least a substantial portion of the colander is capable of being submerged within the liquid during use of the cooking machine.

16. A cooking machine, comprising:

a housing having a container for holding a liquid; said housing including a heater for heating the liquid within the container; and an enclosed colander adapted to hold a food product and having a cover to allow placement of the food product within the colander; the colander being disposed on the container and rotatable through the liquid within the container;

the housing including a mechanism for controlling the rotation of the colander about an axis so that at least a substantial portion of the colander is capable of being submerged within the liquid during one portion of the rotation, and no portion of the colander is submerged within the liquid during another portion of the rotation.

17. The cooking machine of claim 16, wherein the colander has a flat bottom surface and during said another portion of the rotation the flat bottom surface of the colander is fully disposed above the water in the container during use of the cooking machine.

18. A cooking machine, comprising:

a housing having a container for holding a liquid; said container being adapted to heat the liquid within the container when a heat source is supplied to the container; and an enclosed colander adapted to hold a food product and having a cover to allow placement of the food product within the colander; the colander being disposed on the container and rotatable through the liquid within the container;

the housing including a mechanism for controlling the rotation of the colander about an axis so that at least a substantial portion of the colander is capable of being submerged within the liquid during one portion of the rotation, and no portion of the colander is submerged within the liquid during another portion of the rotation.

19. The cooking machine of claim 18, wherein the colander has a flat bottom surface and during said another portion of the rotation the flat bottom surface of the colander is fully disposed above the water in the container during use of the cooking machine.

* * * * *